United States Patent
Williams et al.

(10) Patent No.: US 10,542,104 B2
(45) Date of Patent: Jan. 21, 2020

(54) NODE PROXIMITY DETECTION FOR HIGH-AVAILABILITY APPLICATIONS

(71) Applicant: Red Hat, Inc., Raleigh, NC (US)

(72) Inventors: Daniel C. B. Williams, Minneapolis, MN (US); Rajat Chopra, San Jose, CA (US); Benjamin Bennett, Bedford, MA (US)

(73) Assignee: Red Hat, Inc., Raleigh, NC (US)

( * ) Notice: Subject to any disclaimer, the term of this patent is extended or adjusted under 35 U.S.C. 154(b) by 281 days.

(21) Appl. No.: 15/446,049

(22) Filed: Mar. 1, 2017

(65) Prior Publication Data
US 2018/0255150 A1 Sep. 6, 2018

(51) Int. Cl.
G06F 15/16 (2006.01)
H04L 29/08 (2006.01)
H04L 12/26 (2006.01)

(52) U.S. Cl.
CPC ............. *H04L 67/18* (2013.01); *H04L 43/16* (2013.01)

(58) Field of Classification Search
CPC .............................. H04L 67/18; H04L 43/16
USPC ....................................................... 709/217
See application file for complete search history.

(56) References Cited

U.S. PATENT DOCUMENTS

| | | | |
|---|---|---|---|
| 7,103,807 B2 | 9/2006 | Bosa et al. | |
| 7,549,070 B2 | 6/2009 | Zwinger et al. | |
| 7,792,943 B2 | 9/2010 | Chainer et al. | |
| 8,190,682 B2* | 5/2012 | Paterson-Jones | G06F 9/5055 709/205 |
| 8,527,990 B1* | 9/2013 | Marathe | G06F 9/45558 718/1 |
| 8,737,168 B2 | 5/2014 | Somasundaram et al. | |
| 8,994,532 B2 | 3/2015 | Groth et al. | |
| 9,277,001 B2 | 3/2016 | Ashok et al. | |
| 9,554,239 B2 | 1/2017 | Swaminathan et al. | |
| 10,083,057 B1* | 9/2018 | Currie | G06F 9/45558 |
| 2007/0150608 A1 | 6/2007 | Randall et al. | |
| 2008/0020938 A1* | 1/2008 | Kaplan | C40B 60/12 506/7 |
| 2008/0052721 A1* | 2/2008 | Rangarajan | G06F 9/5016 718/105 |

(Continued)

OTHER PUBLICATIONS

B. Tiwana, M. Balakrishnan, M. K. Aguilera, H. Ballani, and Z. Morley Mao, "Location, Location, Location! Modeling Data Proximity in the Cloud" Oct. 20-21, 2010, 6 pages, University of Michigan Ann Arbor, MI; Microsoft Research Mountain View, CA; Microsoft Research Cambridge, UK.

(Continued)

*Primary Examiner* — Karen C Tang
(74) *Attorney, Agent, or Firm* — Lowenstein Sandler LLP (57) ABSTRACT

Systems and methods for detecting when related applications are running on nodes that that located near one another. An example method may comprise: analyzing beacon data to determine a physical location of a first node and a physical location of a second node; determining an application of the first node and an application of the second node are related applications; detecting the physical location of the first node and the physical location of the second node are within a proximity threshold; and generating, by a processing device, a notification indicating the related applications of the first node and the second node are within the proximity threshold.

20 Claims, 6 Drawing Sheets

(56) References Cited

U.S. PATENT DOCUMENTS

| | | | |
|---|---|---|---|
| 2010/0241507 A1* | 9/2010 | Quinn | G06Q 30/02 705/14.42 |
| 2011/0145380 A1* | 6/2011 | Glikson | G06F 9/4856 709/223 |
| 2012/0013556 A1* | 1/2012 | Chen | G06F 3/017 345/173 |
| 2012/0159476 A1* | 6/2012 | Ramteke | G06F 9/5033 718/1 |
| 2013/0110752 A1* | 5/2013 | Robinson | G06N 3/0454 706/20 |
| 2014/0157269 A1* | 6/2014 | Dow | G06F 9/45558 718/1 |
| 2014/0162544 A1* | 6/2014 | Edge | H04W 8/005 455/3.01 |
| 2014/0359616 A1* | 12/2014 | Nakashima | G06F 9/45558 718/1 |
| 2016/0203024 A1* | 7/2016 | Choi | G06F 9/45558 718/1 |
| 2017/0090914 A1* | 3/2017 | Pandey | G06F 8/70 |
| 2017/0111274 A1* | 4/2017 | Bays | H04L 45/74 |
| 2017/0200115 A1* | 7/2017 | High | G01C 21/343 |
| 2018/0018386 A1* | 1/2018 | Orlova | G06F 3/0482 |
| 2018/0027006 A1* | 1/2018 | Zimmermann | H04L 63/0245 726/11 |

OTHER PUBLICATIONS

F. Richard Yu and Victor Leung, "Advances in Mobile Cloud Computing Systems", Dec. 1, 2015, 1 pages, CRC Press.

\* cited by examiner

NODE PROXIMITY DETECTION FOR HIGH-AVAILABILITY APPLICATIONS

TECHNICAL FIELD

The present disclosure is generally related to determining the physical locations of computing nodes within a distributed computer system, and is more specifically related to detecting when applications designated as high-availability are executing on computing nodes that are close to one another.

BACKGROUND

The virtualization of a data center results in physical systems providing virtualization features that enable data center infrastructure to increase operational efficiencies. The virtualization often enables the execution of applications to be quickly and dynamically moved throughout a data center and may consolidate multiple instances of the application to run on physical systems that are close to one another. Consolidating the multiple instances of the application to physical systems that are close to one another may make the application more susceptible to failures that affect only a portion of the data center (e.g., power failure, network failure, flooding).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern data centers often run computing applications on nodes (e.g., servers) that are spread throughout a data center. The nodes may be damaged or rendered in accessible by a problem within the data center (e.g., power or network failure, flooding, etc.). To enhance the availability of an application, instances of the application may be run on nodes that are physically separated from one another. The physical locations of the nodes are often tracked using a manual process and may be performed at a data center level with each physical location being associated with a physical location within the data center. The use of virtualization may introduce a layer that abstracts the execution of an application from the underlying physical system. This may make it difficult to detect when an application is running on physical systems that are in close proximity (e.g., same rack or adjacent racks).

Aspects of the present disclosure address the above and other deficiencies by providing technology for determining when related applications are running on nodes that are close to one another. Related applications may be separate instances of the same application (e.g., same web server) or may be different applications that interact with or rely on one another to provide a computing service (e.g., web application and underlying web server). In one example, the nodes of a data center may transmit or receive beacon data that can be used to determine the physical location of the nodes. The beacon data may include application data that indicates the applications that are running on one or more of the nodes. The beacon data may be analyzed to determine which applications are running on which nodes and whether multiple nodes running the related applications are within a proximity threshold (e.g., within a predetermined distance from one another).

When the related applications are running on nodes within the proximity threshold a notification may be generated. The notification may cause the configuration of the nodes or distributed system to change so that the related applications are not running close to one another. In one example, the notification may be generated after the related applications begin executing near one another. In other examples, the technology may detect and generate a notification before the related applications are executed near one another. For example, before, during, or after the applications are scheduled to run on their respective nodes (e.g., neighboring nodes).

The systems and methods described herein include technology that enhances the availability of applications running on distributed nodes. In particular, aspects of the present disclosure may enable a node or a management system to detect when related applications are running or scheduled to run on multiple neighboring nodes, which may occur before, during, or after the applications are deployed or initiated on the nodes. Aspects of the present disclosure may also enable a node or management system to take corrective action, which may modify the execution of one or more of the related applications to avoid having the related applications run on physical systems within a predefined distance from one another. The corrective action may involve terminating, rescheduling, moving, other action, or a combination thereof that affects the application, node, or other aspect of the distributed system.

Various aspects of the above referenced methods and systems are described in details herein below by way of examples, rather than by way of limitation. The examples provided below discuss the system and method from the perspective of a node and management server but other examples may involve other aspects of a distributed system.

Figure 1:
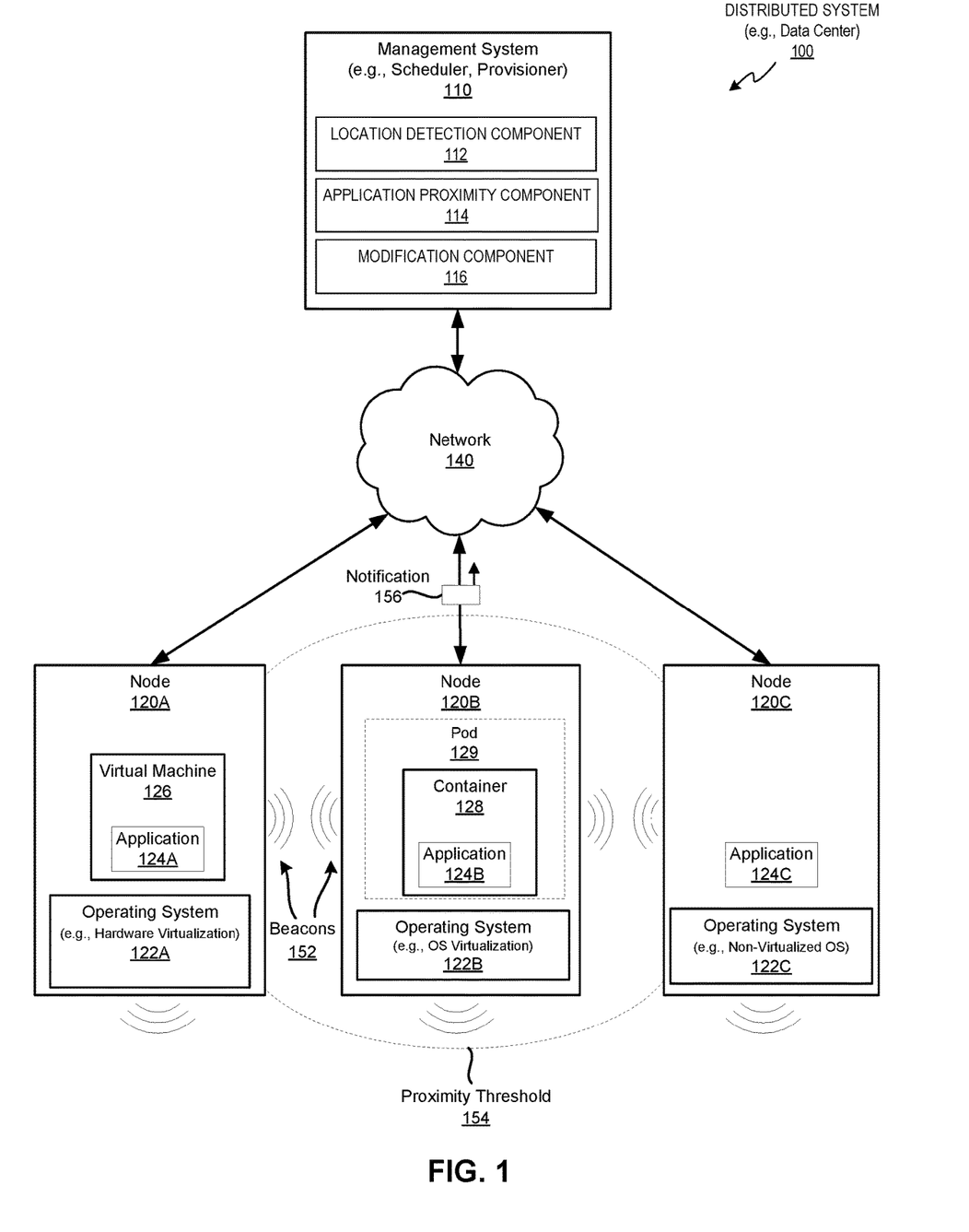
FIG. 1 depicts a high-level block diagram of an example distributed system operating in accordance with one or more aspects of the present disclosure.

FIG. 1 illustrates an example distributed system 100 in which implementations of the disclosure may operate. The distributed system 100 may include a management system 110 and a plurality of nodes 120A-C coupled via a network 140. Network 140 may be a private network (e.g., a local area network (LAN), public network (e.g., the internet), wide area network (WAN)), or a combination thereof. Network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Management system 110 may be hosted by a computing device and include one or more computer programs executed by the computing device for centralized management of distributed system 100. Management system 110 may comprise various interfaces, including administrative interface, reporting interface, and/or application programming interface (API) to communicate with nodes 120A-C, as well as to user portals, databases, directory servers and various other components, which are omitted from FIG. 1 for clarity. In one example, management system 110 may include a scheduler that schedules computing tasks to be executed by one or more nodes 120A-C. In another example, management system 110 may include a provisioning server that creates or configures the one or more nodes 120A-C. In other examples, management system 110 may perform scheduler, provisioning, other management service, or a combination thereof that dynamically adapt to failures in distributed system 100.

The failures (e.g., data center failures) may be any failure that adversely affects one or more physical computer systems of distributed system 100. The failures may include network failures, power failures, air conditioning failures, floods, meteor, structural failures (e.g., roof/floor collapse), other failures, or a combination thereof. The failures may affect a portion of the distributed system and may leave remaining portions of distributed system 100 unaffected. For example, when the distributed system is a data center the failure may affect a region, such as a particular building, floor, room, quadrant, row, other region, or a combination thereof and the remaining regions of the data center may continue functioning.

To reduce the effects of a failure the distributed system 100 may include application proximity features that may be used to detect when related applications are running on physical systems that are located near one another. The dynamic nature of distributed system 100 and the potential presence of virtualization may make this challenging to detect and to resolve. In one example, distributed system 100 may include a location detection component 112, an application proximity component 114, and a notification component 116. In the example shown in FIG. 1, these components are included within management system 110 but in other examples components 112, 114, and 116 may be incorporated into nodes 120A-C or into a combination of management system 110, nodes 120A-C, and other aspects of distributed system 100.

Location detection component 112 may enable distributed system 100 to detect the physical locations of nodes 120A-C. Location detection component 112 may analyze data from one or more beacons 150 to determine the physical location of the nodes. Beacons 150 may be based on electromagnetic (e.g., radio waves), sonic (e.g., sound waves), other technology, or a combination thereof. Beacons 150 may be transmitted by the nodes (e.g., embedded radio frequency transceiver) or by hardware placed in or near the nodes (e.g., access points). The beacons may include proximity data for identifying the physical locations of the nodes and application data for identifying the applications running on the nodes.

Application proximity component 114 may access the proximity data and application data to determine whether nodes that are in close proximity to one another (e.g., within proximity threshold 154) are running related applications. In one example, application proximity component 114 may use one or more topology data structures to map the physical location of the nodes and the applications running on the respective nodes.

Notification component 116 may enable a node or management server to generate a notification 156 and modify the configuration of the nodes to avoid having related applications running on nodes that are in close proximity to one another. Notification component 116 may update the distributed system 100 by terminating an application, rescheduling the application, or moving one or more of the related application to another one of the nodes 120A-C.

Nodes 120A-C may comprise computing devices with one or more processors communicatively coupled to memory devices and input/output (I/O) devices, as described in more details herein below with references to FIG. 6. Operating systems 122A-C may be any program or combination of programs that are capable of using the underlying computing device to perform computing tasks. Operating system 122A-C may include a kernel comprising one or more kernel space programs (e.g., memory driver, network driver, file system driver) for interacting with actual hardware devices or emulated hardware devices. Although nodes 120A-C each comprise a computing device, the term "node" may refer to the computing device (e.g., physical machine), a virtual machine, or a combination thereof. Each of the nodes 120A-C may execute one or more applications 124A-C.

Applications 124A-C may include one or more computer programs that perform a group of coordinated functions, tasks, or activities to provide a computing service. Applications 124A-C may provide web services, database services, file system services, other computing service, or a combination thereof. Each of the applications 124A-C may execute on a separate node but may be considered related applications. In one example, related applications may be separate instances of the same application and may include the same or similar executable information (e.g., executable code) and the same or similar configuration information (e.g., settings). The separate instances may or may not communicate with one another or with the same centralized application. In another example, the related applications may be separate instances of different applications that include one or more dependencies. For example, a first application (e.g. web application) may depend on features provided by another application or platform (e.g., web server). The dependency may be an execution dependency (e.g., code level dependency) or may be an informational, authorization, or other dependency. Applications 124A-C may be characterized or classified as being high-availability applications that are arranged or configured to reduce down time in view of distributed system failures.

Nodes 120A-C may provide one or more levels of virtualization such as hardware level virtualization, operating system level virtualization, other virtualization, or a combination thereof. As shown by node 120A, a node may provide hardware level virtualization by running an operating system that includes hypervisor functionality that provides hardware resources to one or more virtual machines 126. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine.

As shown by node 120B, the nodes (e.g., physical machines or virtual machines) may also or alternatively provide operating system level virtualization. The operating system virtualization may be provided by a computer program that provides computing resources to one or more containers 128. Operating system level virtualization may be implemented within the kernel of operating system 122 and may enable the existence of multiple isolated containers. In one example, operating system level virtualization may not require hardware support and may impose little to no overhead because programs within each of the containers may use the system calls of the same underlying operating system 122B. This may enable node 120B to provide virtualization without the need to provide hardware emulation or be run in an intermediate virtual machine as may occur with hardware level virtualization.

Operating system level virtualization may provide resource management features that isolate or limit the impact of one container on the resources of another container. The operating system level virtualization may provide a pool of resources that are accessible by a container and are isolated from one or more other containers. The pool of resources may include file system resources (e.g., particular volume), network resources (e.g., particular network address), memory resources (e.g., particular memory portions), other computing resources, or a combination thereof. The operating system level virtualization may also limit a container's access to one or more computing resources by monitoring the containers activity and restricting the activity in view of one or more limits (e.g., quotas). The limits may restrict the rate of the activity, the aggregate amount of the activity, or a combination thereof. The limits may include one or more of disk limits, input/out (I/O) limits, memory limits, CPU limits, network limits, other limits, or a combination thereof. In one example, an operating system virtualizer provides the computing resources to one or more containers 128. The operating system virtualizer may wrap an application in a complete file system that contains the code, runtime, system tools, system libraries, and other programs installed on the node that can be used by the application. In one example, the operating system virtualizer may be the same or similar to Docker for Linux®, ThinApp® by VMWare®, Solaris Zones® by Oracle®, or other program that automates the packaging, deployment, and execution of applications inside containers.

Container 128 may refer to a resource-constrained process space of node 120B that can execute functionality of an application 124B. Container 128 may be referred to as a user-space instance, a virtualization engine (VE), a jail, or other term and may appear to a user as a standalone instance of the user space of operating system 122B. Each container 128 may share the same kernel but may be constrained to use only a defined set of computing resources (e.g., CPU, memory, I/O). Aspects of the disclosure can create one or more containers to host a framework or provide other functionality of an application (e.g., proxy agent functionality, database functionality, web application functionality, etc.) and may therefore be referred to as "application containers."

Pod 129 may be a data structure that is used to organize one or more containers 128 and enhance sharing between containers, which may reduce the level of isolation between containers within the same pod. Each pod may include one or more containers that share computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 120B. In another example, the containers associated with a particular pod may be located on different nodes that are on the same or different physical machines.

Figure 2:
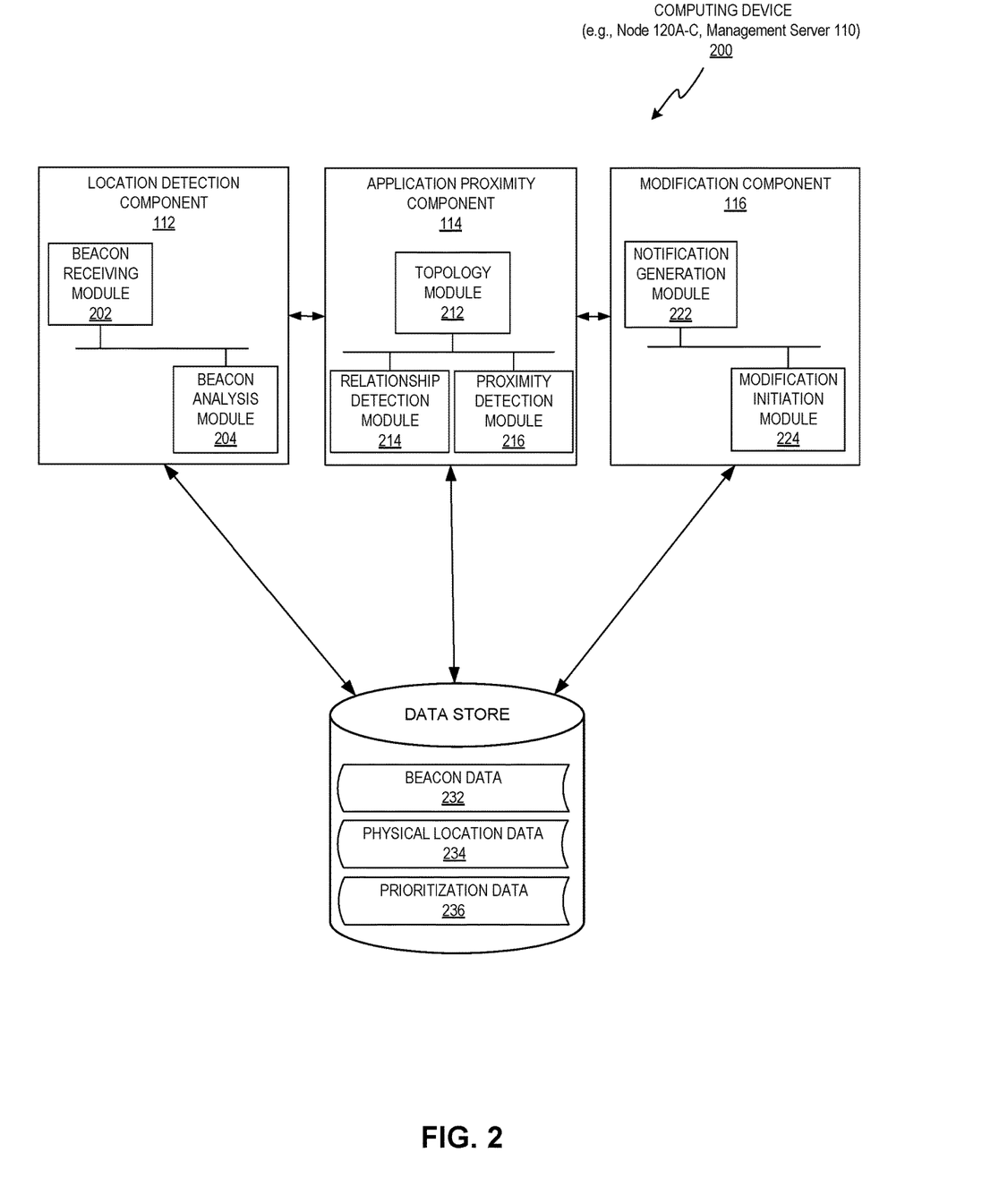
FIG. 2 depicts a block diagram of an example system operating in accordance with one or more aspects of the present disclosure.

FIG. 2 is a block diagram illustrating example components and modules of computing device 200, in accordance with one or more aspects of the present disclosure. Computing device 200 may be the same or similar to management system 110 or to one of the nodes 120A-C of FIG. 1. Computing device 200 may include a location detection component 112, an application proximity component 114, and a notification component 116.

Location detection component 112 may enable computing device 200 to detect the physical locations of one or more nodes based on beacons that are received and/or transmitted by the nodes. Location detection component 112 may include a beacon receiving module 202 and a beacon analysis module 204.

Beacon receiving module 202 may receive beacons from one or more nodes or other pieces of hardware that transmit the beacons. A beacon may be a wireless signal, a wired signal, or a combination thereof. In one example, the beacon may be based on electromagnetic signals that may include radio frequency (RF) signals, infrared signals, optical signals, other signals, or a combination thereof. In another example, the beacon may be based on sonic signals such as ultrasonic signals. Each of the nodes may include hardware that is capable of transmitting and receiving the beacons. In one example, the nodes may include radio frequency transceivers that receive and transmit the beacons using a WiFi® protocol, a Bluetooth® protocol, other standard or proprietary protocol, or a combination thereof.

Beacon analysis module 204 may analyze the beacons to determine physical location of one or more nodes. Beacon analysis module 204 may analyze one or more beacons to identify physical location data 234 for an individual node or a group of nodes (e.g., rack device supporting multiple nodes). For example, beacon analysis module 204 may analyze beacons from multiple different sources (e.g., neighboring nodes) to calculate the physical location of the receiving node or the physical location of the transmitting node. The analysis may involve determining a physical attribute of the beacon, such as a signal strength, a frequency, a propagation delay, other attribute, or a combination thereof. Calculating the physical location may involve a localization technique such as triangulation, which may involve determining a location of a node by forming triangles from other nodes or other known points within a data center. The physical location of a node may be a relative physical location or an absolute physical location. The relative physical location may be a location of a node relative to one or more other nodes or points (e.g., landmarks) within a data center. An absolute physical location may be a location of a node that corresponds to an existing coordinate system associated with the data center. The coordinate system could be based on an architectural layout of a data center or may be based on geographic locations comprising latitude and longitude pairs.

Beacon analysis module 204 may analyze the beacons to determine beacon data 232. Beacon data 232 may be embedded within the beacon signals or may be derived in view of the beacons. Beacon data may include proximity data, application data, other data, or a combination thereof. The proximity data may indicate or identify the location of the device (e.g., node) that transmits the beacon or may provide information that may be used to determine the location of the device that originated the beacon. The application data may indicate or identify the applications on the node transmitting the beacon or may provide information that may be used to determine the applications on the node. The applications on the node may include one or more applications that are currently or have previously been installed, scheduled, or run on the node transmitting the beacon.

Application proximity component 114 may access the proximity data and application data to determine whether related applications are running on nodes that are in close proximity to one another. In the example shown in FIG. 2, application proximity component 114 may include a topology module 212, a relationship detection module 214, and a proximity detection module 216.

Topology module 212 may create and update one or more topology data structures that represent the physical locations of the nodes and the applications running on the respective nodes. The one or more topology data structures may include a node topology data structure and an application topology data structure. The node topology data structure may be associated with node topology data and may represent the physical locations of one or more nodes and the distances between the one or more nodes. As discussed above, the physical locations may be relative physical locations or absolute physical locations. The application topology data structure may represent the applications of the one or more nodes and may be used by relationship detection module 214.

Relationship detection module 214 may analyze the application data of the nodes to determine which nodes include related applications. As discussed above, related applications may be separate instances of the same application or may be different applications that interact with or rely on one another to provide a computing service. The application data for each node may be derived directly from the beacons or indirectly from the beacons. For example, the application data may be derived directly from the beacons when the beacons include application identification information (e.g., application IDs, version numbers, etc.) and may be derived indirectly from the beacons when the beacons include information that may function as a key to lookup application identification information in a data store. Relationship detection module 214 may compare the application data (e.g., application identification information) of the nodes to determine which nodes include related applications. Nodes with related applications may be analyzed by proximity detection module 216.

Proximity detection module 216 may determine whether neighboring nodes with related applications are within a proximity threshold of a particular node. The proximity threshold may specify a particular distance between the multiple nodes (e.g., 5, 50, 500 ft). The distance may be a static distance that is predetermined or may be a dynamic distance determined using information available at runtime. Proximity detection module 216 may determine the physical distance between a first node and the second node and compare the physical distance to the particular distance to determine whether the proximity threshold is satisfied. The proximity threshold may be satisfied when the distance between the nodes meets or exceeds (e.g., greater than) the proximity threshold.

The proximity threshold may be determined in view of layout information associated with a data center such as dimensions of the data center or different regions of the data center (e.g., building, floor, room). In one example, the proximity threshold may be based on the region of the data center and may cause the related applications to be run by nodes in different regions (e.g., different buildings/floors/rooms/quadrants). In another example, the proximity threshold may be based on a dimension of a region (e.g., length/width, rack row/column) and nodes with related applications may need to be some proportion of the dimension away from one another. The proportion may be any numeric value from a minimum value (e.g., 0%) indicating the nodes can be next to one another to a maximum value (e.g., 100%) indicating the nodes should be at opposite sides of the region (e.g., opposing ends or corners of a room).

Notification component 116 may generate a notification that indicates multiple nodes within a proximity threshold are running related applications. Notification component 116 may also enable the computing device or distributed system to initiate a modification of the distributed system to separate or further spread apart the execution of the related applications. Notification component 116 may include a notification generation module 222 and a modification initiation module 224.

Notification generation module 222 may generate and transmit a notification to a one or more computing devices within or external to the distributed system. The notification may include data to identify the related applications and may include data to identify the one or more nodes associated with the related applications. In one example, notification component 116 may generate the notification while the related applications are simultaneously executing on each respective node. In another example, notification generation module 222 may generate the notification before the related applications are executed on one or more of the nodes within the proximity threshold. In the latter example, the notification generation module 222 may be executing on a management system (e.g., central management node) that is performing scheduling tasks or on the node that has been instructed to execute one of the related applications.

Modification initiation module 224 may interact with one or more computing devices of the distributed system to modify where the related applications are physically executed. Modification initiation module 224 may initiate an update to the distributed system that causes one or more of the related applications to be terminated, rescheduled (e.g., paused), or moved to one or more nodes that are outside of the proximity threshold. In one example, the modification initiation module 224 may access prioritization data 236 to determine whether to initiate and when to initiate the action. For example, if prioritization data 236 has a lower value it may indicate that the modification can be delayed and that the related applications can remain on neighboring nodes. However, if the prioritization data 236 has a higher value it may indicate that the modification should not be delayed and that the related applications should not remain on neighboring nodes.

Figure 3:
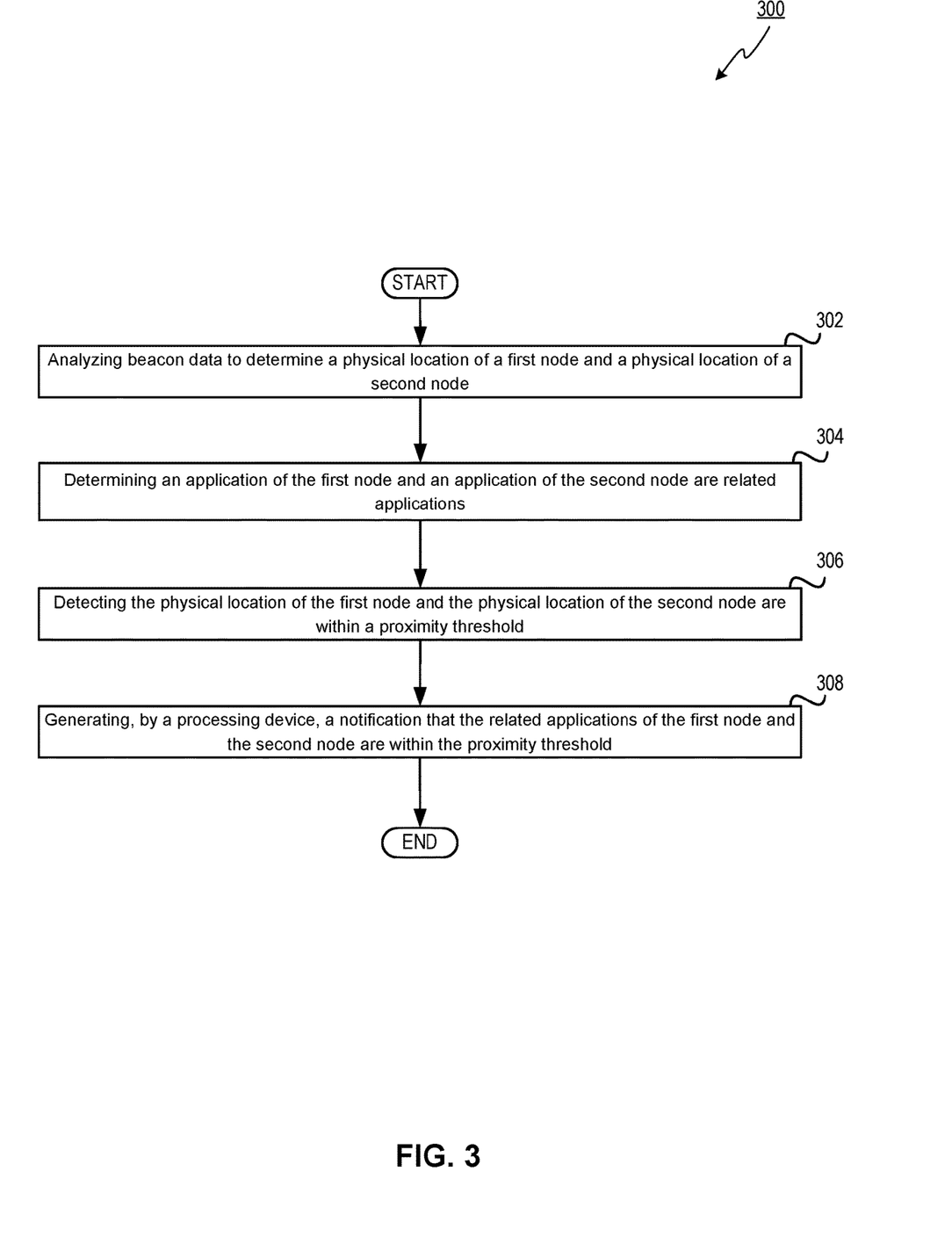
FIG. 3 depicts a flow diagram of an example method for detecting when related applications are running on nodes within a proximity threshold, in accordance with one or more aspects of the present disclosure.

FIG. 3 depicts a flow diagram of an illustrative example of a method 300 for detecting when related applications are running on nodes within a proximity threshold, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 6:
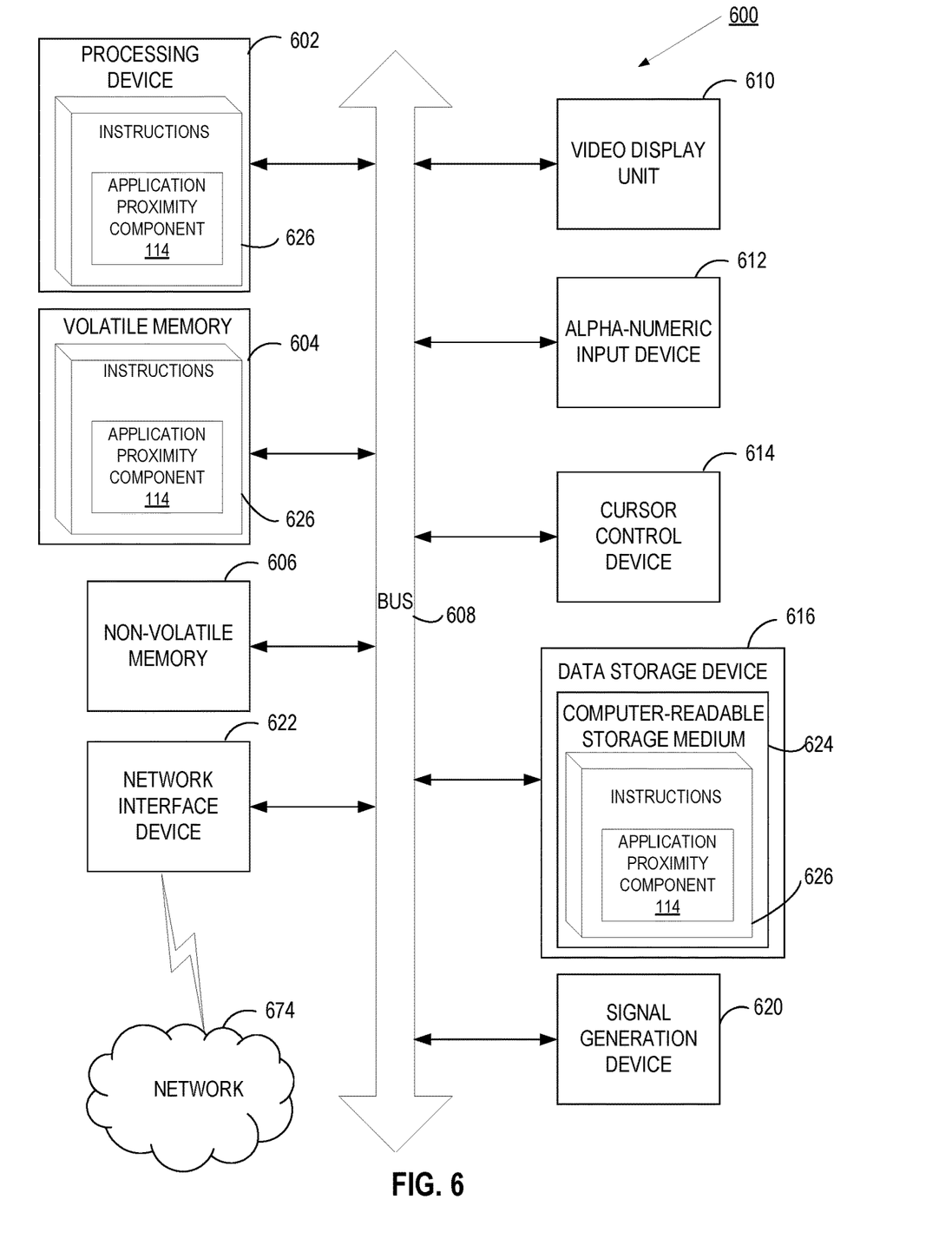
FIG. 6 depicts a block diagram of an illustrative computing device operating in accordance with the examples of the present disclosure.

Method 300 may be performed by processing devices of one or more computing devices as shown and described in FIGS. 1, 2 and 6. In one example, method 300 may be performed by a management server or a central management node that is separate from the nodes running the related applications. The central management node may perform functions of the management system discussed above (e.g., scheduling, provisioning). In another example, method 300 may be performed by a node running one of the related applications. In the latter example, the node may provide operating system level virtualization for a first and a second container that each comprise a user space process executing on a kernel of the node. The first container may execute one of the related applications and the second container may perform method 300 to detect whether multiple related applications are within the proximity threshold. The first and second containers may be associated with the same pod or a different pods.

Method 300 may begin at block 302 where a processing device may analyze beacon data to determine a physical location of a first node and a physical location of a second node. The physical location may be a relative physical location or an absolute physical location, wherein the relative physical location is relative to one or more nodes within a data center and the absolute physical location corresponds to a coordinate system associated with the data center. The beacon data may include proximity data for identifying the physical locations of the first and second nodes and may include application data for identifying the applications of the first and second nodes.

The beacon data may be wirelessly transmitted by the first node to the second node and both the first and second nodes may be contained within the same physical or logical data center. In one example, the node may include a wireless device (e.g., WiFi® or Bluetooth® transceiver) that is used to transmit the beacons and transmit networking packets (e.g., Internet Protocol (IP) packets). In another example, the node may use the wireless device to transmit beacons without using the wireless device or any wireless device to transmit networking packets. In this latter situation, the wireless communications within the data center may be used only for the beacons and not for networked communication. In one example, the processing device may create or update a node topology in view of the beacon data.

At block 304, the processing device may determine an application of the first node and an application of the second node are related applications. The related applications may be different instances of a same computer program and may be simultaneously executing on each respective node prior to generating the notification that the related applications are within the proximity distance. In one example, the processing device may create or update an application topology in view of any related applications and in view of the node topology.

At block 306, the processing device may detect the physical location of the first node and the physical location of the second node are within a proximity threshold. The proximity threshold may be determined in view of at least one of a dimension of the data center, a region of the data center, or a room of the data center. In one example, the processing device may determine a physical distance between the first node and the second node and may compare the physical distance to a threshold distance based on the proximity threshold.

At block 308, the processing device may generate a notification that indicates that the related applications of the first and second nodes are within the proximity threshold. In one example, the generation of the notification may occur prior to the related applications being executed on both the first and second nodes. In another example, the generation of the notification may occur after the related applications have begun executing on both the first and second nodes. Responsive to completing the operations described herein above with references to block 308, the method may terminate.

In alternate examples of method 300, the processing device may receive a request to schedule the related applications to run on multiple nodes of a cluster. The processing device may select from the multiple nodes the first node and the second node to run the related applications. In one example, responsive to the notification that the related applications are within the proximity threshold, the processing device may select a third node to run one of the related applications. In another example, the processing device may initiate a modification of the application of the first node in response to the notification. The modification may terminate the application of the first node, reschedule the application of the first node, or move the application from the first node to a node that is outside of the proximity threshold.

Figure 4:
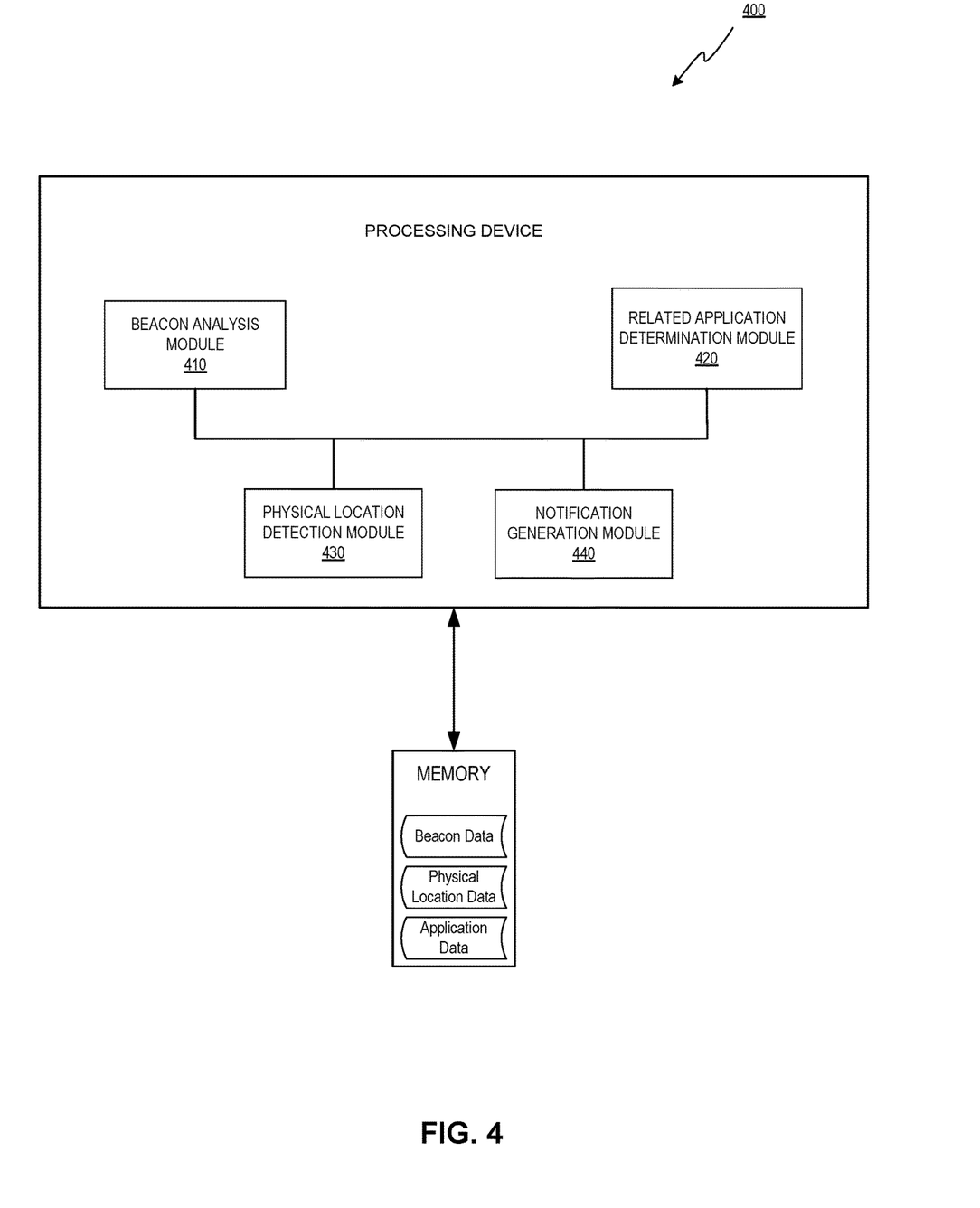
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computing device 200 of FIG. 2 and computer system 600 of FIG. 6 and may include one or more processing devices and one or more memory devices. In the example shown, computer system 400 may include a beacon analysis module 410, a related application determination module 420, a physical location detection module 430, and a notification generation module 440.

Beacon analysis module 410 may instruct a processing device to analyze beacon data in order to determine a physical location of a first node and a physical location of a second node. The physical location may be a relative physical location or an absolute physical location, wherein the relative physical location is relative to one or more nodes within a data center and the absolute physical location corresponds to a coordinate system associated with the data center. The beacon data may include proximity data for identifying the physical locations of the first node and the second node and may include application data for identifying the applications of the first node and the second node.

Related application determination module 420 may instruct the processing device to determine an application of the first node and an application of the second node are related applications. The related applications may be different instances of a same computer program and may be simultaneously executing on each respective node prior to generating the notification that the related applications are within the proximity distance. In one example, the processing device may create or update an application topology in view of any related applications and in view of the node topology.

Physical location detection module 430 may instruct the processing device to detect whether the physical location of the first node and the physical location of the second node are within a proximity threshold. The proximity threshold may be determined in view of at least one of a dimension of the data center, a region of the data center, or a room of the data center. In one example, the processing device may determine a physical distance between the first node and the second node and may compare the physical distance to a threshold distance based on the proximity threshold.

Notification generation module 440 may instruct the processing device to generate a notification indicating that the related applications of the first and second nodes are within the proximity threshold. In one example, the generation of the notification may occur prior to the related applications being executed on both the first and second nodes. In another example, the generation of the notification may occur after the related applications have begun executing on both the first and second nodes.

Figure 5:
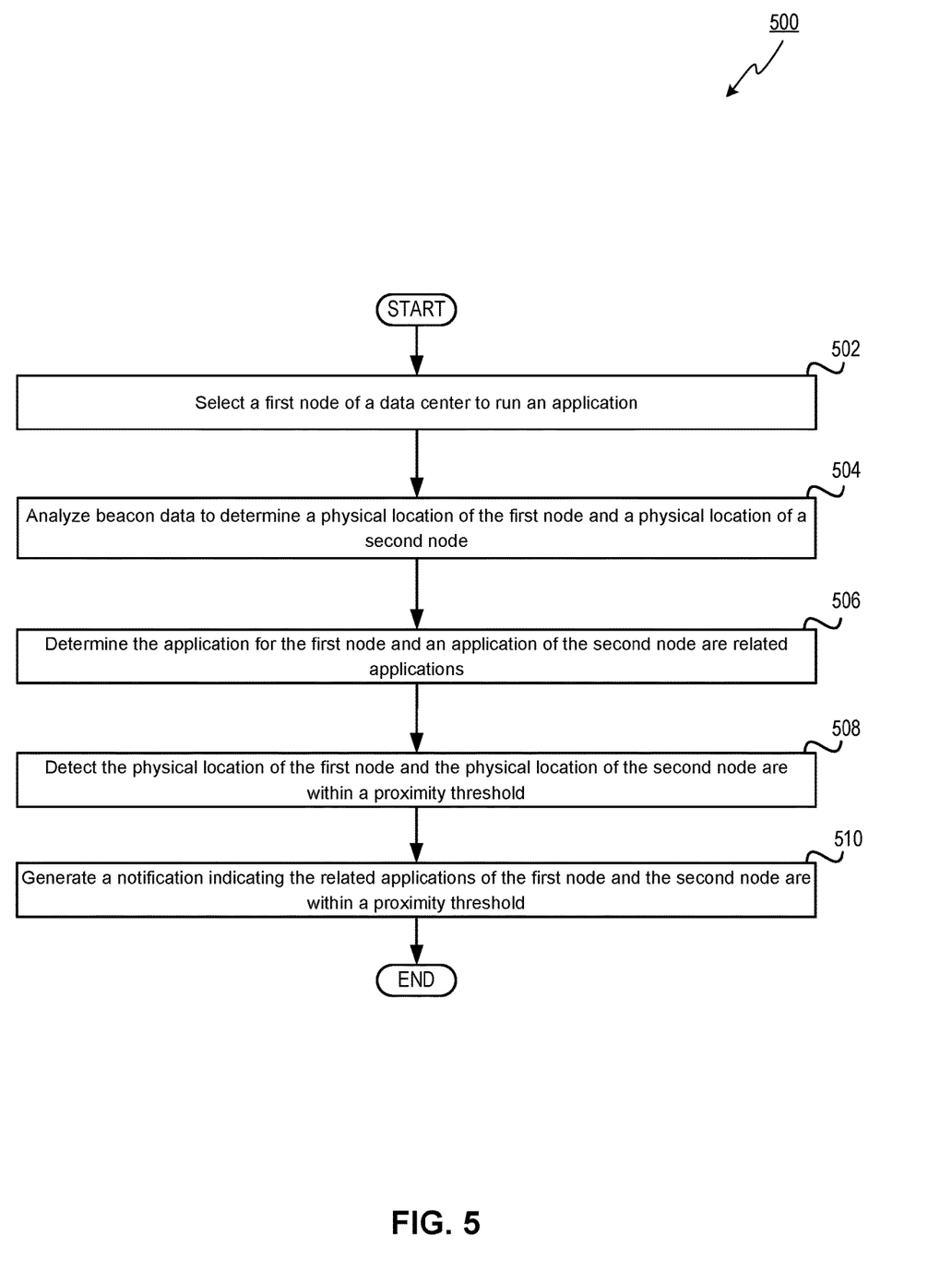
FIG. 5 depicts a flow diagram of another example method for detecting when related applications are running on nodes within a proximity threshold, in accordance with one or more aspects of the present disclosure.

FIG. 5 depicts a flow diagram of one illustrative example of a method 500 for detecting when related applications are running on nodes within a proximity threshold, in accordance with one or more aspects of the present disclosure. Method 500 may be similar to method 300 and may be performed in the same or a similar manner as described above in regards to method 300. Method 500 may be performed by processing devices of a server device or a client device and may begin at block 502. At block 502 a processing device may select a first node of a data center to run an application. The processing device may be performing a role of a scheduler and may identify one or more nodes within the data center to execute the application. The remaining steps of the method may be performed prior to scheduling the application to run on the first node.

At block 504, the processing device may analyze beacon data to determine a physical location of a first node and a physical location of a second node. The physical location may be a relative physical location or an absolute physical location, wherein the relative physical location is relative to one or more nodes within a data center and the absolute physical location corresponds to a coordinate system associated with the data center. The beacon data may include proximity data for identifying the physical locations of the first node and the second node and may include application data for identifying the applications of the first node and the second node.

At block 506, the processing device may determine the application of the first node and an application of the second node are related applications. The related applications may be different instances of a same computer program and may be simultaneously executing on each respective node prior to generating the notification that the related applications are within the proximity distance. In one example, the processing device may create or update an application topology in view of any related applications and in view of the node topology.

At block 508, the processing device may detect the physical location of the first node and the physical location of the second node are within a proximity threshold. The proximity threshold may be determined in view of at least one of a dimension of the data center, a region of the data center, or a room of the data center. In one example, the processing device may determine a physical distance between the first node and the second node and may compare the physical distance to a threshold distance based on the proximity threshold.

At block 510, the processing device may generate a notification that indicates that the related applications of the first and second nodes are within the proximity threshold. In one example, the generation of the notification may occur prior to the related applications being executed on both the first and second nodes. In another example, the generation of the notification may occur after the related applications have begun executing on both the first and second nodes. Responsive to completing the operations described herein above with references to block 510, the method may terminate.

FIG. 6 depicts a block diagram of a computer system operating in accordance with one or more aspects of the present disclosure. In various illustrative examples, computer system 600 may correspond to computing device 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW)

microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding application proximity component 114 illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
analyzing beacon data to determine a physical location of a first node and a physical location of a second node;
determining the first node comprises a first application and the second node comprises a second application, wherein the first application and the second application are related applications;
detecting, by the processing device, that the related applications are associated with a physical separation that is less than or equal to a proximity threshold value; and
responsive to the detecting, initiating a modification to increase the physical separation and cause the related applications to execute on nodes that have a physical separation exceeding the proximity threshold value.

2. The method of claim 1, wherein the beacon data is wirelessly received by the first node from one or more nodes of a data center.

3. The method of claim 1, wherein the beacon data comprises proximity data for identifying the physical locations of the first node and the second node and comprises application data for identifying applications of the first node and the second node.

4. The method of claim 1, wherein the proximity threshold value is determined in view of a dimension of a data center.

5. The method of claim 1, wherein the method is performed by a central management node that is separate from the first node and the second node.

6. The method of claim 1, wherein the method is performed by the first node, wherein the first node provides operating system level virtualization for a first container that executes the first application and for a second container that detects the physical separation is within the proximity threshold value.

7. The method of claim 6, wherein the first container and the second container are associated with a pod, wherein the first container and the second container each comprise a user space process executing on a kernel of the first node.

8. The method of claim 1, wherein the related applications are different instances of a computer program.

9. The method of claim 1, wherein the related applications simultaneously execute on different nodes prior to the detecting.

10. The method of claim 1, further comprising generating a notification that indicates the related applications are to execute on nodes having a physical separation that is less than or equal to the proximity threshold value, wherein the generating occurs prior to the related applications being executed on either the first node or the second node.

11. The method of claim 10, wherein the modification comprises an update of the first application in response to the notification, and wherein the modification further comprises terminating the first application, rescheduling the first application, or moving the first application to a third node.

12. The method of claim 10, further comprising:
receiving a request to schedule the related applications to run on multiple nodes of a cluster;
selecting from the multiple nodes the first node and the second node to run the related applications; and
responsive to the notification that the related applications are within the proximity threshold value, selecting a third node to run one of the related applications.

13. A system comprising:
a memory;
a processing device operatively coupled to the memory, the processing device to:
analyze beacon data to determine a physical location of a first node and a physical location of a second node;
determine the first node comprises a first application and the second node comprises a second application, wherein the first application and the second application are related applications;
detect that the related applications are associated with a physical separation that is less than or equal to a proximity threshold value; and
in response to the detection, initiate a modification to increase the physical separation and cause the related applications to execute on nodes that have a physical separation exceeding the proximity threshold value.

14. The system of claim 13, wherein the beacon data is wirelessly received by the first node from one or more nodes of a data center.

15. The system of claim 13, wherein the beacon data comprises proximity data for identifying the physical locations of the first node and the second node and comprises application data for identifying applications of the first node and the second node.

16. The system of claim 13, wherein the proximity threshold value is determined in view of a dimension of a data center.

17. A non-transitory machine-readable storage medium storing instructions that cause a processing device to:
select a first node of a data center to run a first application;
analyze beacon data to determine a physical location of the first node and a physical location of a second node;
determine the first application for the first node and a second application of the second node are related applications;
detect that the related applications are associated with a physical separation that is less than or equal to a proximity threshold value; and
responsive to the detection, initiate a modification to increase the physical separation and cause the related applications to execute on nodes that have a physical separation exceeding the proximity threshold value.

18. The non-transitory machine-readable storage medium of claim 17, wherein the beacon data is wirelessly received by the first node from one or more nodes of a data center.

19. The non-transitory machine-readable storage medium of claim 17, wherein the beacon data comprises proximity data for identifying the physical locations of the first node and the second node and comprises application data for identifying applications of the first node and the second node.

20. The non-transitory machine-readable storage medium of claim 17, wherein the proximity threshold value is determined in view of a dimension of the data center.

* * * * *